Figure 1:
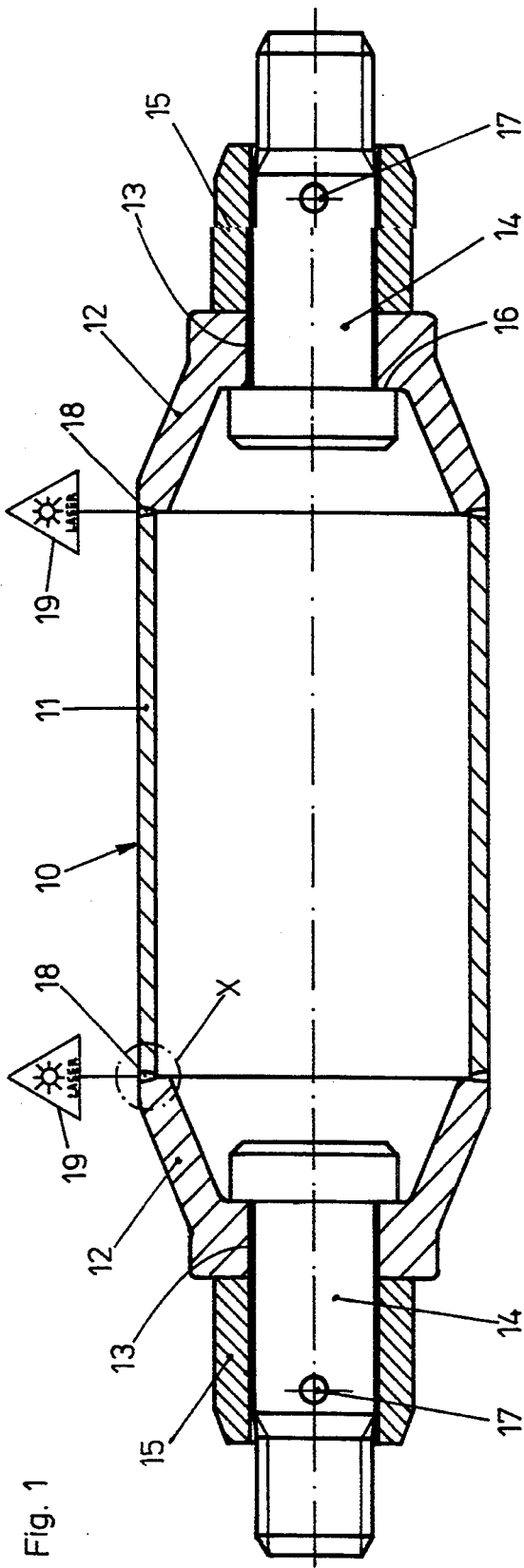

United States Patent [19]

Eberlein et al.

[11] Patent Number: 5,382,771
[45] Date of Patent: Jan. 17, 1995

[54] METHOD FOR MANUFACTURING GALVANIZED BAR SEGMENTS, IN PARTICULAR FOR LATTICEWORKS OR THREE-DIMENSIONAL FRAMEWORKS

[75] Inventors: Helmut Eberlein, Wurzburg; Gunther Bruckner, Abtswind; Reinhard Schmidek, Eibelstadt, all of Germany

[73] Assignee: MERO-Raumstruktur GmbH & Co., Wurzburg, Germany

[21] Appl. No.: 193,598

[22] Filed: Feb. 9, 1994

[30] Foreign Application Priority Data

Feb. 10, 1993 [DE] Germany .................. 4303826

[51] Int. Cl.$^6$ ............................................. B23K 26/00
[52] U.S. Cl. ...................... 219/121.64; 219/159
[58] Field of Search ............. 219/121.14, 121.64, 219/159, 121.63

[56] References Cited

U.S. PATENT DOCUMENTS 5,183,991  2/1993  Arai ..................... 219/121.64

FOREIGN PATENT DOCUMENTS 2240613  3/1975  Germany .

*Primary Examiner*—C. L. Albritton
*Attorney, Agent, or Firm*—Frank P. Presta

[57] ABSTRACT

To render more economical the manufacture of galvanized bar segments 10 illustratively used for three-dimensional frameworks, the components of the bar segments 10, namely the hollow bar 11 and the end pieces 12, are galvanized before being assembled. The ring welds between the galvanized components 11, 12 are implemented by laser welding. Because of the high energy density of the laser welding beam and on account of the narrow ring-weld seams 18 so formed, a zinc coating 24 supplied from the zinc coats 22 of the adjacent components 11, 12 is created during welding and covers each surface 25 of the ring-weld seams, as a result of which, following welding, the bar segment 10 also is provided with a zinc coating 24 covering the surfaces 25 of the ring-weld seams protecting them against corrosion.

2 Claims, 1 Drawing Sheet

U.S. Patent  Jan. 17, 1995  5,382,771

METHOD FOR MANUFACTURING GALVANIZED BAR SEGMENTS, IN PARTICULAR FOR LATTICEWORKS OR THREE-DIMENSIONAL FRAMEWORKS

The invention concerns a method for manufacturing galvanized bar segments, in particular for latticeworks or three-dimensional frameworks, preferably frustoconical end pieces being affixed by ring welds to the ends of a hollow bar, ring welding being carried out while rotating both the hollow bars and the end pieces held in axially fixed (clamped) and mutually oppositely centered positions.

The bar segments being discussed herein comprises in their end pieces screws which can be rotated by so-called wrench muffs, as a result of which the bar segments can be affixed to joints with concentric threaded boreholes in order to create latticeworks of three-dimensional frameworks for the most diverse applications. The bar segments as a rule are made of steel and require protection against corrosion, which frequently will be in the form of galvanized coatings. For that purpose the finished bar segments consisting of a hollow bar and welded-on end pieces are galvanized in conventional manner, the liquid zinc potentially being able to move through holes also into the insides of the bar segments. The affixing screws are inserted and then safety-pinned through the said holes into the end pieces only upon completed galvanization of the bar segments. Such a procedure however is quite complex and time-consuming. This is also the case for ring welding when connecting the end pieces to the hollow bar. Heretofore this ring welding was denoted as electric inert-gas welding, also as Metal-Active-Gas (MAG) welding (see German patent 2,240,613). Such electric, inert-gas welding further requires always setting a small gap between the hollow-bar ends and the end pieces, said gap in turn requiring being filled with additive welding materials. On the other hand the bar segments being discussed herein demand tight length tolerances which must be taken into account when welding the hollow bars to the end pieces.

The object of the invention is to create a method for manufacturing galvanized bar segments, in particular for latticeworks and three-dimensional frameworks, said method being simpler and more economical than the procedures of the state of the art.

The above problem is solved by the invention in that the hollow bar and the end pieces for each bar segment are galvanized individually and in that thereupon ring welding between the galvanized hollow bar and the end pieces is carried out using laser welding in such a way that during welding a zinc coating supplied from the molten zinc coats of the adjacent parts to be connected is automatically formed across every ring-weld seam. In the invention therefore the hollow bars and the end pieces for the bar segments are galvanized separately from one another, and this feature entails many significant advantages. Thus the holes in the bar segments required in the state of the an are eliminated, which would allow coating material to get inside the bar segments, and through which the affixing screws are inserted. The bar segments of the invention with their unbroken, i.e. unweakened cross-section therefore, can bear higher loads. Using laser welding to join the end pieces to the hollow bar offers the advantage that both the thermally affected zone and the visible weld-seam surfaces at the ton side of the hollow bar can be reduced to a fraction of what they are in conventional welding. The invention exploits this advantage of laser welding because the above mentioned lesser dimensions and the greater speed of laser welding achieve that the anti-corrosion zinc coating is partly molten at the edges of the components to be welded together, in that this zinc coating flows over the narrow ring weld seams and covers them. Upon completion of welding, a closed skin of zinc covers each ring-weld seam surface and joins the zinc coats at the edges of the welded parts. The skin of zinc in the area of the ring-weld seams is slightly reduced compared to the zinc coats of the welded-together, individual components, said reduction being without effect as regards corrosion-proofing, on the other hand the slight width of the ring-weld seams renders the cathodic self protection of the zinc coatings fully effective. Moreover, laser welding offers the further advantage over conventional electric, inert-gas welding that on account of the high power density of the laser beams, laser welding will be substantially quicker and furthermore additive welding materials are not required. Advantageously therefore the end pieces can lie snugly against the hollow-bar ends during laser welding, and thereby the length tolerances of the bar segments to be made are more easily observed.

In one implementing mode of the invention, the hollow bar and the end pieces of the bar segments are coated with roughly 80 $\mu$ of zinc. For such a thickness of zinc on the individual components of the bar segment, there shall always be a sufficiently thick layer of zinc on the ring-weld seams following termination of laser welding.

The invention is illustratively elucidated below in relation to the drawing.

Figure 2:
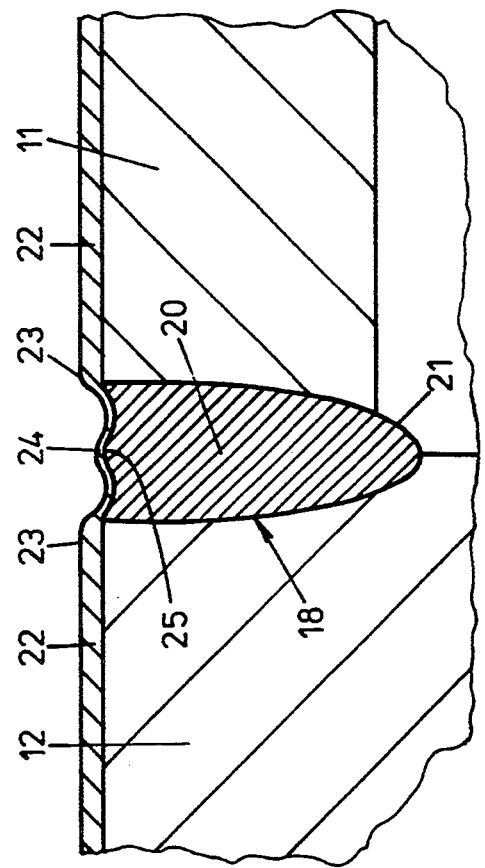

FIG. 1 is a longitudinal section of a bar segment for instance in a three-dimensional framework of which the individual parts are joined while being galvanized by laser welding, and FIG. 2 is a much enlarged detail of the region X of FIG. 1.

The reference 10 denotes a representative bar segment used for instance in a three-dimensional framework consisting of a plurality of such bar segments 10 and of omitted joints. The steel bar segments 10 are galvanized outside and inside to protect them against corrosion.

In more detail, the bar segment 10 is constituted by a hollow bar or pipe section 11 and by two illustratively end pieces 12. Each end piece 12 comprises a central borehole 13 through which passes an affixing screw 14. Each affixing screw 14 can be rotated by a so-called drive muff 15 and an omitted rotating tool applied to said muff into at threaded borehole in an omitted joint, the head of the affixing screw 14 coming to rest against an annular support surface 16 in the end pieces 12. A conventional pin-slot connection, of which only the pin 17 is shown in FIG. 1, is present between the drive muff 15 and the shank of the affixing screw 14.

These components are separately galvanized before the end pieces 12 are joined by laser ring welds to the hollow bar 11. To manufacture the bar segment 10, the hollow bar 11 and the end pieces 12 are clamped into axially fixed and mutually centered positions in an omitted, rotatable clamping device. In the process the butt edges of the hollow bar 11 are kept resting tightly against the corresponding butt edges of the end pieces 12. As already mentioned, the end pieces 12 are ring-welded, i.e. they are joined by annular weld seams 18, to the hollow bar 11, these welds being produced by the schematically shown laser welding equipment 19. The laser welding equipment 19 is stationary and the clamped components 11 and 12 of the bar segment 10 are rotated past the laser welding equipment 19 by the motor-driven clamping device.

Illustratively the two ring-weld seams 18 can be made simultaneously and therefore it will suffice to describe in detail only one welding procedure.

Because of the high power density of the laser welding beam, a ring-weld seam 18 is formed with a comparatively deep burn-in zone 20 of which the dip 21 extends over the cross-sectional thickness of the hollow bar or pipe section 11. Nevertheless the burn-in zone 20 is exceedingly narrow. Accordingly the annular cross-sections at the butt ends of the hollow bar or pipe section 11 will be fully used for the weld-connection.

Because of the already mentioned high power density of the laser beam, the zinc coatings 22 at the edges 23 of the components 11 and 12 to be welded together will fuse and the liquid zinc flows into the somewhat lower zone above the surface 25 of the ring-weld seam. Upon completion of welding, a coating 24 of zinc which is integral with the zinc coats 22 or the components 11 and 12 and which furthermore is also circumferentially closed will run over the surface 25 of the ring-weld seam. While the zinc coating 24 is thinner than the zinc coats 22 on the components 11 and 12, the thickness of the coating 24 is entirely adequate for the desired protection against corrosion, the more so that the width of the zinc coating 24 as well as of the ring-weld seam 18 is minute.

Even though it was stated above that the two ring-weld seams 18 can be made simultaneously, it is also feasible to form them sequentially with only one laser welding apparatus 19. Thereby too time shall be saved compared to the conventional electric inert gas welding procedure because laser welding is much faster than conventional welding.

In order to ensure a sufficiently coating of zinc 24 over the ring-weld seams 18, it was found that a zinc coat 22 about 80 $\mu$ thick on the components 11 and 12 to be joined by welding will suffice. The wall thickness of the hollow bar 11 or pipe section as a rule will be between 1.5 and 4 min, though it may be as high as up to about 10 mm, in order to achieve the above described advantages using laser welding.

We claim:

1. A method for manufacturing galvanized bar segments, in particular for latticeworks or three-dimensional frameworks, preferably frustoconical end pieces being affixed by ring welds to the ends-of a hollow bar segment, the ring welding being carried out while rotating the hollow bar and the end pieces in axially fixed (clamped) and mutually centered positions, characterized in that the hollow bar 11 and the end pieces 12 for each bar segment 10 are galvanized individually and that thereupon the ring welds 18 between the galvanized hollow bar 11 and the galvanized end pieces 12 are implemented by laser welding in such a way that during welding a zinc coating 24 supplied from the fused zinc coats 22 of the adjacent components 11, 12 to be joined will be automatically formed over each surface 25 of the ring-weld seams.

2. Method defined in claim 1, characterized in that the hollow bar 11 and the end pieces 12 of the bar segments 10 are fitted with a zinc coat 22 roughly 80 $\mu$ thick.

* * * * *